US008601485B2

(12) United States Patent
Engh-Halstvedt et al.

(10) Patent No.: US 8,601,485 B2
(45) Date of Patent: Dec. 3, 2013

(54) DATA PROCESSING APPARATUS AND METHOD FOR PROCESSING A RECEIVED WORKLOAD IN ORDER TO GENERATE RESULT DATA

(75) Inventors: Andreas Due Engh-Halstvedt, Trondheim (NO); Jørn Nystad, Trondheim (NO)

(73) Assignee: ARM Limited, Cambridge (GB)

( * ) Notice: Subject to any disclaimer, the term of this patent is extended or adjusted under 35 U.S.C. 154(b) by 205 days.

(21) Appl. No.: 13/067,341

(22) Filed: May 25, 2011

(65) Prior Publication Data

US 2012/0304194 A1 Nov. 29, 2012

(51) Int. Cl.
*G06F 9/46* (2006.01)

(52) U.S. Cl.
USPC .......................................... 718/106; 345/418

(58) Field of Classification Search
None
See application file for complete search history.

(56) References Cited

U.S. PATENT DOCUMENTS

| | | | | |
|---|---|---|---|---|
| 6,212,542 B1* | 4/2001 | Kahle et al. | ................... | 718/102 |
| 6,345,242 B1* | 2/2002 | Dearth et al. | ................... | 703/22 |
| 7,111,156 B1* | 9/2006 | Mang et al. | .................... | 712/228 |
| 8,201,179 B2* | 6/2012 | Dearth et al. | .................. | 718/104 |
| 8,336,056 B1* | 12/2012 | Gadir | ............................ | 718/104 |
| 2008/0028196 A1* | 1/2008 | Kailas | ........................... | 712/245 |
| 2009/0147016 A1* | 6/2009 | Barone et al. | ................. | 345/581 |
| 2009/0240931 A1* | 9/2009 | Coon et al. | .................... | 712/234 |
| 2010/0023926 A1* | 1/2010 | Sugawara et al. | ............ | 717/120 |
| 2010/0123717 A1* | 5/2010 | Jiao | ................................ | 345/426 |
| 2010/0262812 A1* | 10/2010 | Lopez et al. | ................... | 712/228 |
| 2011/0078381 A1* | 3/2011 | Heinrich et al. | .............. | 711/122 |
| 2012/0096474 A1* | 4/2012 | Jiao | ................................ | 718/107 |
| 2012/0110586 A1* | 5/2012 | Coon et al. | .................... | 718/102 |
| 2012/0210073 A1* | 8/2012 | Eichenberger et al. | ....... | 711/146 |

* cited by examiner

*Primary Examiner* — Emerson Puente
*Assistant Examiner* — Dong Kim
(74) *Attorney, Agent, or Firm* — Nixon & Vanderhye P.C.

(57) ABSTRACT

A data processing apparatus and method are provided for processing a received workload in order to generate result data. A thread group generator generates from the received workload a plurality of thread groups to be executed to process the received workload. Each thread may be either an active thread whose output is required to form the result data, or a dummy thread required to resolve the inter-thread dependency for one of the active threads but whose output is not required to form the result data. Execution flow modification circuitry is responsive to the received thread group having at least one dummy thread, to cause the thread execution unit to selectively omit at least part of the execution of at least one of the plurality of instructions when executing each dummy thread, in dependence on control information associated with the predetermined program.

15 Claims, 9 Drawing Sheets

OPERATIONS PERFORMED BY TEXTURE LOOKUP INSTRUCTION

READ SAMPLING DESCRIPTOR

READ TEXTURE DESCRIPTOR

CALCULATE TEXTURE COORDINATES FOR THIS PIXEL

IF NECESSARY ⎡ WAIT FOR BARRIER
CALCULATE DERIVATIVES ($\delta x + \delta y$) AND MAKE AVAILABLE TO ALL FOUR THREADS IF (SKIP OR KILL) AND DUMMY
    IF SKIP
        WRITE 'BLACK' TO DESTINATION REGISTER
    IF KILL
        EXIT THREAD ELSE
    LOOKUP TEXELS FROM MEMORY
    DO BILINEAR INTERPOLATION (IF REQUIRED)
    COMBINE RESULTS
    WRITE TEXEL COLOUR TO DESTINATION REGISTER

FIG. 7

| SHADER PROGRAM EXAMPLES | INSTRUCTION (FOR DUMMY EXECUTION THREAD) | KILL FLAG SET | SKIP FLAG SET |
|---|---|---|---|
| EX1 | | | |
| TEXTURE LOOKUP | PARTIAL | ✓ | ✗ |
| LIGHTING OPERATION | OMITTED | | |
| OUTPUT PIXEL COLOUR | OMITTED | | |
| EX2 | | | |
| TEXTURE LOOKUP 1 | PARTIAL | ✗ | ✓ |
| LIGHTING OPERATION | COMPLETE | | |
| TEXTURE LOOKUP 2 | PARTIAL | | |
| COMBINE OPERATION | COMPLETE | | |
| OUTPUT PIXEL COLOUR | COMPLETE | | |
| EX3 (DISTORTED TEXTURING) | | | |
| CALCULATE TEXTURE POSITION | COMPLETE | ✓ | ✗ |
| TEXTURE LOOKUP | PARTIAL | | |
| LIGHTING OPERATION | OMITTED | | |
| OUTPUT PIXEL COLOUR | OMITTED | | |
| EX4 (SHADER WITH SIDE EFFECTS) | | | |
| TEXTURE LOOKUP | COMPLETE | ✗ | ✗ |
| LIGHTING OPERATION | COMPLETE | | |
| STORE RESULT TO MEMORY | COMPLETE | | |
| OUTPUT PIXEL COLOUR | COMPLETE | | |
| EX5 (HYBRID SKIP/KILL) | | | |
| CALCULATE TEXTURE POSITION | COMPLETE | | |
| TEXTURE LOOKUP 1 | PARTIAL | ✗ | ✓ |
| LIGHTING OPERATION | COMPLETE | | |
| TEXTURE LOOKUP 2 | PARTIAL | ✓ | ✗ |
| COMBINE OPERATION | OMITTED | | |
| OUTPUT PIXEL COLOUR | OMITTED | | |

✓ ≡ SET
✗ ≡ NOT SET

DATA PROCESSING APPARATUS AND METHOD FOR PROCESSING A RECEIVED WORKLOAD IN ORDER TO GENERATE RESULT DATA

FIELD OF THE INVENTION

The present invention relates to a data processing apparatus and method for processing a received workload in order to generate result data, and in particular to such an apparatus and method where a plurality of thread groups are constructed which are then executed to process the received workload.

DESCRIPTION OF THE PRIOR ART

Various data processing systems exist where a workload is processed as a series of threads, where each thread involves execution of a program in a particular context. For example, in a graphics processing system, a thread execution unit will execute a plurality of the threads, where each thread involves execution of a shader program in a particular context, in this example the particular context representing data for a particular pixel. Hence, each thread causes the shader program to be executed for a particular pixel of the output image.

In such a graphics processing system, it is known to group threads together to form thread groups in order to improve throughput. In one particular embodiment, groups of four threads are formed (such a group sometimes being referred to as a "quad") and each thread group is dispatched to the thread execution unit. One situation where this is useful is where the thread group has an inter-thread dependency existing between the plurality of threads, and hence by executing the threads of the thread group together that inter-thread dependency can be resolved in an efficient manner.

The forming of threads into thread groups when processing a received workload is not restricted to graphic processing systems. For example, in a more generic processing environment, the OpenCL (Open Computing Language) provides a framework for writing programs that execute across heterogeneous platforms consisting of CPUs, GPUs, and other processors, and also allows groups of related threads to be formed into thread groups (referred to in OpenCL as "workgroups"), and again one reason for placing a number of threads into such a workgroup is where there is an inter-thread dependency existing between those threads.

Returning to the graphics processing example, some graphics processing system architectures arrange for the various threads of a thread group to be executed in parallel through use of multiple execution pipelines, such that the execution of the various threads occurs in lock step. Such an approach can yield high performance, but typically is not power consumption efficient.

In architectures where power consumption is a more key constraint, it is often the case that the threads are processed through a reduced number of pipelines, such that particular instructions executed for each thread of the thread group follow each other through the relevant pipeline. Rendezvous points can be defined within such pipelines to ensure that each thread executes to a point where the inter-thread dependency can be resolved, before execution then continues. Such an approach can provide improved flexibility when writing shader programs, and also allows a reduction in power consumption.

Due to inter-thread dependencies existing, it is often the case that some of the threads in a particular thread group are not actually active threads whose output is required to form the result data for the received workload, but instead are dummy threads required to resolve the inter-thread dependency for one of the active threads, but whose output is not required to form the result data. A significant amount of the data processing apparatus resources can be consumed in the handling of such dummy threads.

It would be desirable to provide a technique which allowed the performance of a data processing apparatus handling such thread groups to be increased.

SUMMARY OF THE INVENTION

Viewed from a first aspect, the present invention provides a data processing apparatus for processing a received workload in order to generate result data, comprising: a thread group generator configured to generate from the received workload a plurality of thread groups to be executed to process the received workload, each thread group comprising a plurality of threads, and at least one thread group having an inter-thread dependency existing between said plurality of threads; each thread being either an active thread whose output is required to form the result data, or a dummy thread required to resolve said inter-thread dependency for one of said active threads but whose output is not required to form the result data, the thread group generator identifying for each thread group any dummy thread within that thread group; a thread execution unit configured to receive each thread group generated by the thread group generator, and to execute each thread within a received thread group by executing a predetermined program comprising a plurality of program instructions; and execution flow modification circuitry, responsive to the received thread group having at least one dummy thread, to cause the thread execution unit to selectively omit at least part of the execution of at least one of said plurality of instructions when executing said at least one dummy thread, in dependence on control information associated with the predetermined program.

In accordance with the present invention, if a thread group received by the thread execution unit has at least one dummy thread, execution flow modification circuitry is provided which references control information associated with the predetermined program, and based on that control information selectively omits at least part of the execution of at least one of the plurality of instructions when executing each dummy thread. This can significantly reduce the execution resource consumed in the handling of the dummy threads, thereby freeing up that execution resource for performing other operations. As a result, the overall performance of the data processing apparatus can be significantly improved without the need to provide additional execution resources such as additional execution pipelines. In addition, since such an approach can enable a particular workload to be processed more quickly, it can also lead to an overall reduction in power consumption for the data processing apparatus.

There are a number of ways in which the control information associated with the predetermined program can be generated. For example, such control information can be manually created by the programmer at the time the predetermined program is written. Alternatively, the data processing apparatus can be arranged to analyse the control flow within the thread execution unit "on the fly" as the predetermined program is executed, in order to determine such control information. However, in one embodiment the control information is generated when the predetermined program is compiled. In particular, the compiler can be arranged to analyse the program as it is compiled in order to determine appropriate control information to associate with the predetermined program.

When the execution flow modification circuitry makes reference to the control information can be varied dependent on embodiment. In one embodiment, the execution flow modification circuitry is configured to reference the control information at least once during execution of the predetermined program for each dummy thread, in order to determine whether to cause the thread execution unit to omit at least part of the execution of at least one of said plurality of instructions when executing that dummy thread. Hence, in such embodiments, as the predetermined program is executed for each dummy thread within the received thread group, the execution flow modification circuitry will refer to the control information at at least one point in order to determine whether any subsequent processing steps can be avoided, either by avoiding execution of one or more of the instructions altogether, or by avoiding at least some of the processing steps required to completely execute at least one of the instructions.

In one embodiment, the plurality of program instructions comprise at least one dependency-relevant instruction which requires at least partial execution for each thread in the received thread group in order to produce data required to resolve said inter-thread dependency, and the execution flow modification circuitry is configured, for each dummy thread, to reference the control information on execution by the thread execution unit of at least one dependency-relevant instruction within said predetermined program.

The control information can take a variety of forms. However, in one embodiment the control information comprises a kill indicator which when set indicates that, after execution of the dependency-relevant instruction causing said kill indicator to be referenced, execution of all remaining instructions in the predetermined program is to be omitted for each dummy thread. Hence, if the kill indicator is set, this can significantly reduce the computation required to handle dummy threads, since any instructions after a dependency-relevant instruction that has caused the kill indicator to be referenced can be omitted. Such an approach is useful where, for example, the dummy thread is only being executed in order to produce the data required to resolve the inter-thread dependency and no other output from the dummy thread is required for any subsequent processing. Assuming all of the data required to resolve the inter-thread dependency is available once the dependency-relevant instruction causing the kill indicator to be referenced has been executed, then there is no need to execute the remaining instructions, and by setting the kill indicator this can cause those dummy threads to exit early, thereby freeing up the resources of the data processing apparatus for other computations.

In one embodiment, the thread execution unit is configured to execute said at least one dependency-relevant instruction as a multi-part process, and the data required to resolve said inter-thread dependency is produced after a first part of the multi-part process has been executed. The execution flow modification circuitry is then configured to reference the kill indicator following execution by the thread execution unit of said first part of the multi-part process for each thread within the received thread group, and to further omit execution of remaining parts of the multi-part process for each dummy thread if said kill indicator is set. In such an embodiment, since execution of the dependency-relevant instruction occurs as a multi-part process, and not all of that process needs to be performed before the data required to resolve the inter-thread dependency is produced, then any remaining parts of the multi-part process used to completely execute the dependency-relevant instruction can also be omitted for a dummy thread if the kill indicator is set. This allows the dummy thread to be terminated even earlier, thereby further improving performance of the data processing apparatus.

In an alternative embodiment, or in addition, the control information may comprise a skip indicator. When using such a skip indicator, the thread execution unit is configured to execute said at least one dependency-relevant instruction as a multi-part process, and the data required to resolve said inter-thread dependency is produced after a first part of the multi-part process has been executed. The execution flow modification circuitry is then configured to reference the skip indicator following execution by the thread execution unit of said first part of the multi-part process for each thread within the received thread group, and to omit execution of remaining parts of the multi-part process for each dummy thread if said skip indicator is set. Use of the skip indicator is useful where it is not appropriate to omit all remaining instructions in the predetermined program, for example because one or more of those instructions may generate data that is required later by the data processing apparatus. However, by using the skip indicator, the resources required to handle each dependency-relevant instruction can be reduced, since for a dummy thread such a dependency-relevant instruction only needs to be partially executed, i.e. to the point where it produces the data required to resolve the inter-thread dependency.

There are a number of ways in which the set skip indicator can cause the thread execution unit to omit the remaining parts of the multi-part process for each dummy thread. In one embodiment, this is done by generating a default value to represent the result of execution of the at least one dependency-relevant instruction, rather than performing the remaining parts of the multi-part process. There are a number of ways to achieve this within a pipelined execution unit, but in one embodiment a bubble-type approach can be adopted where the default value is piped through the remaining stages of the pipelined execution unit, but with no further computation being performed in those stages.

The thread execution unit can be arranged in a variety of ways. In one embodiment, the thread execution unit comprises at least one execution pipeline and issue circuitry for issuing each instruction in the predetermined program to an appropriate one of said at least one execution pipeline. The at least one execution pipeline comprises a first execution pipeline for processing a first dependency-relevant instruction of said predetermined program, and the issue circuitry is configured, when executing the received thread group, to issue the first dependency-relevant instruction for each thread of the received thread group into the first execution pipeline. The first execution pipeline comprises a barrier execution stage which execution of the first dependency-relevant instruction for each thread must reach before any subsequent stages of the pipeline are entered to perform the remaining execution of the first dependency-relevant instruction for each thread, at said barrier execution stage the data required to resolve said inter-thread dependency having been produced. The execution flow modification circuitry is then configured to reference said control information after execution of the first dependency-relevant instruction for every thread of the received thread group has reached the barrier execution stage.

Use of a barrier execution stage provides a rendezvous point within the first execution pipeline such that execution of the first dependency-relevant instruction for each thread has to reach that stage before further execution of those instructions takes place. This can ensure that all of the data required to resolve the inter-thread dependency is available before that information needs to be consumed. However, since that information will only need to be consumed by an active thread within the thread group, then by referencing the control information after the barrier execution stage has been reached, it is possible to curtail further execution of any dummy threads within the thread group. In particular, if the skip indicator is set, then no further processing is required to complete execution of the first dependency-relevant instruction for each dummy thread. Similarly, if the kill indicator is set, then it is also possible to omit execution of any of the remaining instructions of the predetermined program for each dummy thread.

There are a number of ways in which the execution flow modification circuitry can be incorporated within the data processing apparatus. In one embodiment, the execution flow modification circuitry is incorporated into a stage of the first execution pipeline following the barrier execution stage.

In one embodiment, the control information may be specified globally for the predetermined program, such that wherever that control information is referenced by the execution flow modification circuitry during execution of the predetermined program, the same control information is used. However, in an alternative embodiment the control information may be specified separately for each dependency-relevant instruction of the predetermined program. In one embodiment, this hence enables both skip and kill indicators to be set independently for each dependency-relevant instruction, thereby yielding further performance benefits by seeking to keep to a minimum the amount of execution resource required to handle each dummy thread.

Whilst the data processing apparatus can take a variety of forms, in one embodiment the received workload is a graphics rendering workload, and the thread execution unit is used to perform a graphics rendering operation in order to generate, as the result data, pixel values and associated control values. In one embodiment, the data processing apparatus can form a graphics core of a graphics processing unit. In one particular embodiment, the graphics processing unit may comprise multiple graphics cores, and each graphics core can incorporate a data processing apparatus in accordance with the first aspect of the present invention.

In one embodiment, the received workload is provided to the thread group generator as a plurality of primitives to be rendered.

The number of threads in each thread group will vary dependent on implementation. However, in one particular embodiment, each thread group comprises four threads.

Viewed from a second aspect, the present invention provides a method of operating a data processing apparatus to process a received workload in order to generate result data, comprising: generating from the received workload a plurality of thread groups to be executed to process the received workload, each thread group comprising a plurality of threads, and at least one thread group having an inter-thread dependency existing between said plurality of threads, each thread being either an active thread whose output is required to form the result data, or a dummy thread required to resolve said inter-thread dependency for one of said active threads but whose output is not required to form the result data; identifying for each thread group any dummy thread within that thread group; for each thread group, executing within a thread execution unit each thread of said thread group by executing a predetermined program comprising a plurality of program instructions; and responsive to said thread group having at least one dummy thread, causing the thread execution unit to selectively omit at least part of the execution of at least one of said plurality of instructions when executing said at least one dummy thread, in dependence on control information associated with the predetermined program.

Viewed from a third aspect, the present invention provides a data processing apparatus for processing a received workload in order to generate result data, comprising: a thread group generator means for generating from the received workload a plurality of thread groups to be executed to process the received workload, each thread group comprising a plurality of threads, and at least one thread group having an inter-thread dependency existing between said plurality of threads; each thread being either an active thread whose output is required to form the result data, or a dummy thread required to resolve said inter-thread dependency for one of said active threads but whose output is not required to form the result data, the thread group generator means for identifying for each thread group any dummy thread within that thread group; thread execution means for receiving each thread group generated by the thread group generator means, and for executing each thread within a received thread group by executing a predetermined program comprising a plurality of program instructions; and execution flow modification means for causing, in response to the received thread group having at least one dummy thread, the thread execution means to selectively omit at least part of the execution of at least one of said plurality of instructions when executing said at least one dummy thread, in dependence on control information associated with the predetermined program.

BRIEF DESCRIPTION OF THE DRAWINGS

The present invention will be described further, by way of example only, with reference to embodiments thereof as illustrated in the accompanying drawings, in which:

FIG. 7 schematically illustrates the sequence of operations performed when executing a texture lookup instruction within the texture pipeline of the thread execution unit of FIG. 3 in accordance with one embodiment;

FIG. 8 schematically illustrates five example shader programs and indicates the effect of the kill flag and skip flag on the execution of the instructions forming those shader programs when executing a dummy thread in accordance with one embodiment.

DESCRIPTION OF EMBODIMENTS

Figure 1:
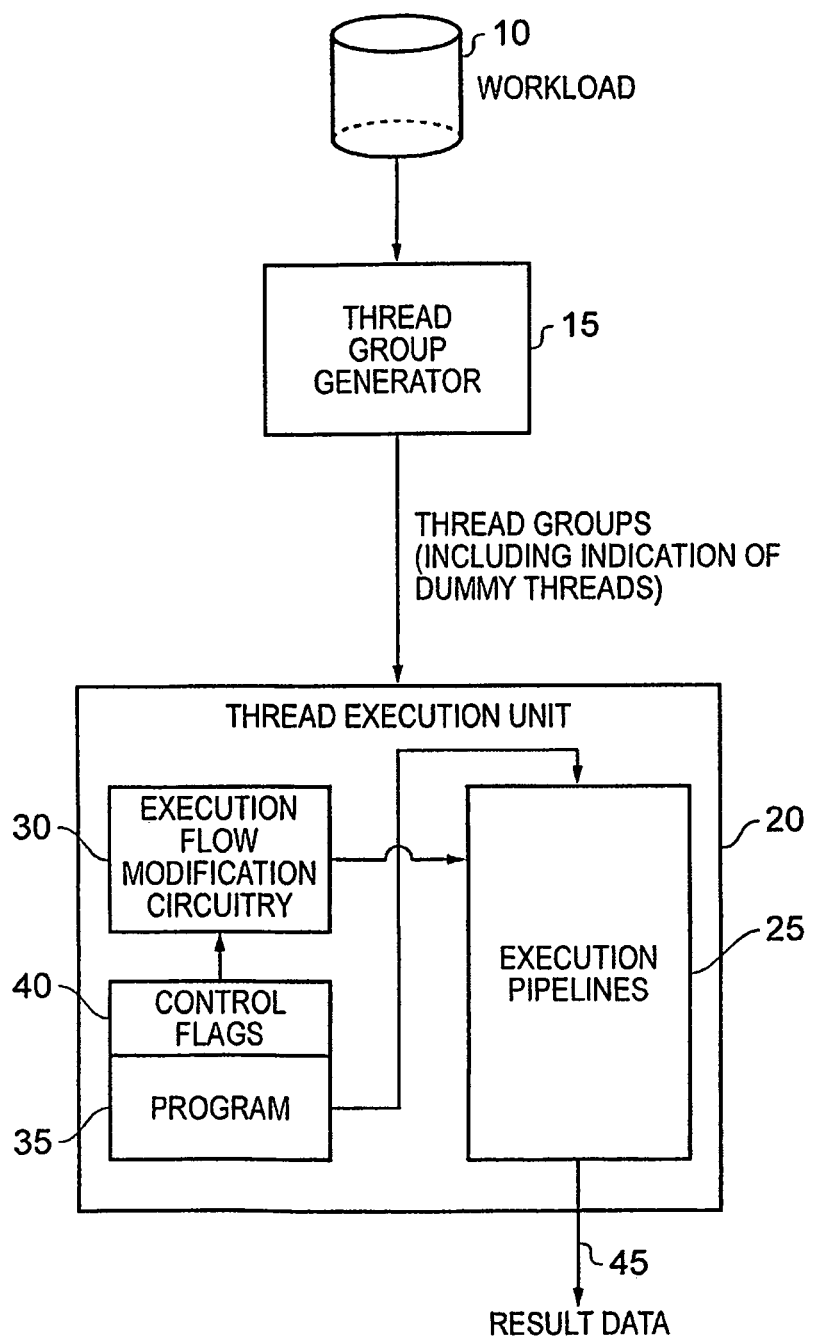
FIG. 1 is a block diagram schematically illustrating a data processing apparatus in accordance with one embodiment.

FIG. 1 is a block diagram schematically illustrating a data processing apparatus in accordance with one embodiment. The data processing apparatus includes a thread group generator circuit 15 which receives a workload 10 and based thereon generates a plurality of program thread groups to be executed to process the workload 10. Each thread group comprises a plurality of threads, and a number of those thread groups will each have an inter-thread dependency existing between the plurality of threads of that thread group.

The threads may be active threads whose output is required to form the result data ultimately output over path 45 from the thread execution unit 20, or instead may be dummy threads that are required to resolve the inter-thread dependency for one of the active threads but whose output is not required to form the result data. A thread group generator circuit 15 is arranged when issuing the thread groups to include an indication of any dummy threads within each thread group.

Each thread group generated by the thread group generator 15 is passed to the thread execution unit 20, the thread execution unit 20 being arranged for each thread of the thread group to execute a predetermined program 35 within one or more execution pipelines 25. The program 35 will consist of a plurality of program instructions, and in association with the program 35 control information in the form of control flags 40 is provided, such control flags either being provided globally for the program or being provided specifically in association with one or more of the individual program instructions.

When the thread execution unit is executing the program 35 in respect of a dummy thread, execution flow modification circuitry 30 is arranged to reference the control flags 40 and, dependent on the state of those control flags, to selectively omit at least part of the execution of at least one of the instructions within the execution pipelines 25. By taking such actions, the amount of execution pipeline resource required to execute each dummy thread can be significantly reduced, thereby freeing up those execution pipeline resources for the handling of other threads, and hence increasing the overall performance of the data processing apparatus. In addition, since the workload can be processed more quickly, the overall power consumption can be reduced.

It has been found that there are many instances where the data produced by the dummy thread that is required to resolve the inter-thread dependency for one of the active threads becomes available before the entire program 35 has been executed in respect of that dummy thread. Further, it is often the case that no further data generated by that dummy thread is required for further reference by the thread execution unit 20, and accordingly in such situations it is beneficial to curtail the processing performed to handle the dummy thread thereby allowing an early exit of the program 35 from the execution pipeline 25 when executing a dummy thread.

Whilst the data processing apparatus of FIG. 1 may be used to process a variety of different types of workload data, in one embodiment the received workload is a graphics rendering workload and the thread execution unit 20 is used to perform graphics rendering operations in order to generate, as the result data output over path 45, pixel values and associated control values. In particular, in one embodiment, the data processing apparatus takes the form of a shader core of a graphics processing unit, such a shader core of one embodiment being illustrated in FIG. 2. In this embodiment, the shader core includes a level one cache 105 for storage of data required by the shader core, cache misses in the level one cache causing other levels of cache within the graphics processing unit and/or main memory to be accessed in order to retrieve the required data. As will be understood by those skilled in the art, the input to a graphics rendering process will typically be a set of primitives which need to be rendered, such primitives often being triangles, but also sometimes taking the form of points or lines to be displayed in an output frame. The primitive setup circuitry 100 is arranged to read a primitive list identifying the various primitives which need to be displayed.

Whilst this list may relate to an entire frame, it is often the case that the frame is split up into a plurality of tiles. In particular, tile-based graphics systems have been developed where, for each frame to be displayed, the frame is partitioned into a plurality of areas called tiles. For each graphics primitive to be displayed in the frame, a binning unit is provided for performing a, binning operation in order to determine which of the various tiles that graphics primitive intersects. In particular, the binning unit will typically specify a plurality of bins and then, based on coordinate data for the graphics primitive, will determine which tile or tiles that graphics primitive intersects, and for each tile that is intersected will record an identifier for that graphics primitive within the relevant bin. In such a tile-based graphics system, the primitive setup circuitry 100 will typically read in the primitives list for a particular bin, i.e. a list of the primitives that need to be displayed within the corresponding tile of the display frame.

The primitive setup circuitry 100 will then extract the relevant primitives data from the list and provide that primitives data to a rasterizer circuitry 110. Considering the earlier tile-based approach, the rasterizer circuitry 110 will determine, for each primitive, which pixels of the tile contain that primitive. The rasterizer circuitry will then create one thread for every pixel containing the primitive under consideration, and will then group those threads into thread groups. Any pixel that contains the primitive gives rise to an active thread since it will be necessary to generate pixel data for that pixel in order to represent the primitive in the output image. However, due to the algorithms applied in order to process such active pixels, it is often necessary to obtain certain information about adjacent pixels which may not themselves contain the primitive. Threads are also created for such additional pixels, these threads being referred to as dummy threads since they are required to resolve an inter-thread dependency with an associated active thread, but there is no need to produce any output pixel data for those dummy threads since they do not themselves contain the primitive.

Figure 4:
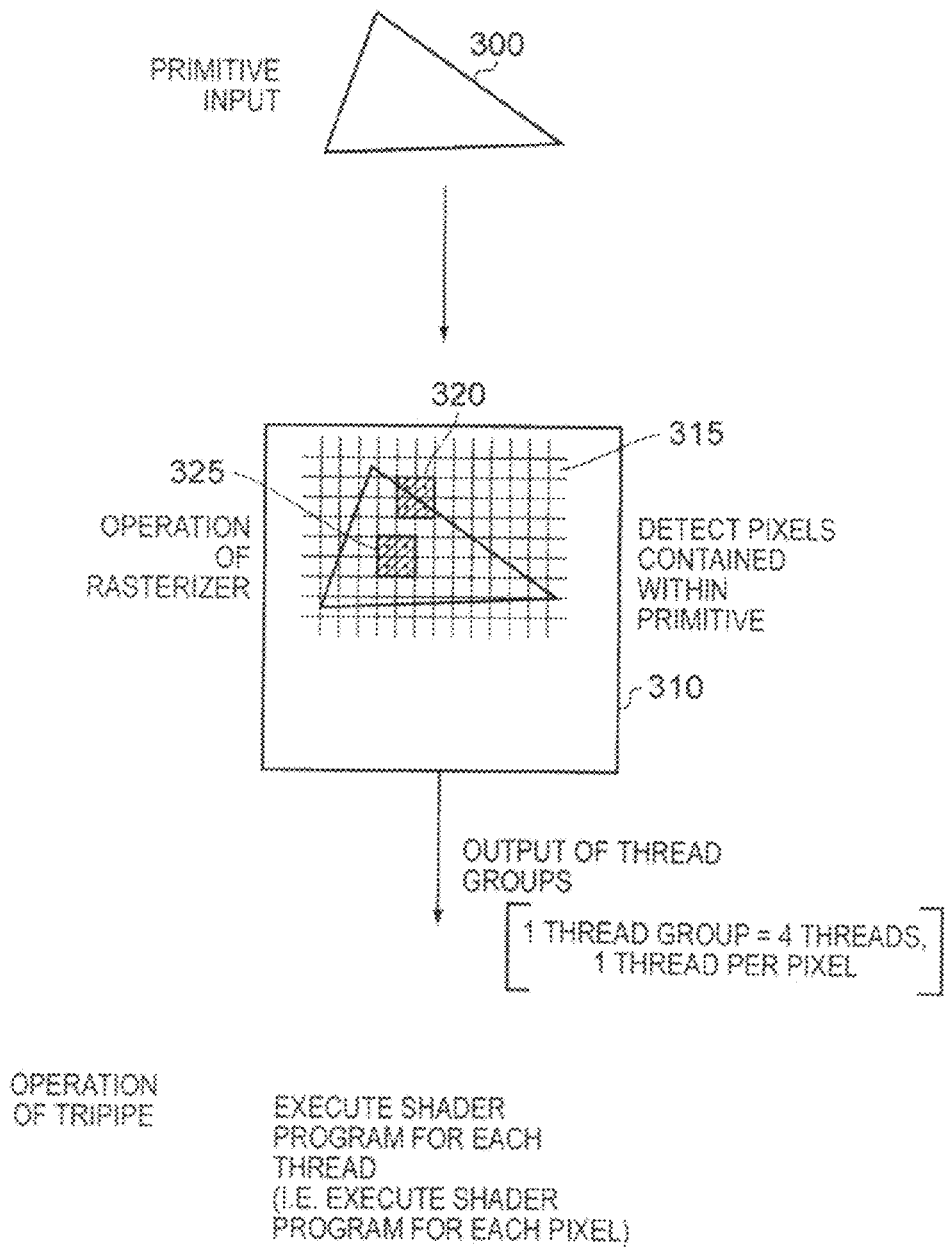
FIG. 4 schematically illustrates the operation of the rasterizer circuitry of FIG. 2 in accordance with one embodiment.

This is illustrated schematically in FIG. 4, which shows a primitive in the form of triangle 300 being located within the tile space 310 containing a plurality of pixels 315 by the rasterizer circuitry 110. The set of four pixels represented by the box 325 are entirely contained within the primitive 300, and hence each of those pixels will be represented by a separate active thread. In contrast, the set of four pixels represented by the box 320 includes only a single pixel within the primitive 300, along with three further pixels for which information may be required in order to correctly render that pixel. Whilst the pixel inside the primitive 300 is represented by an active thread, these three additional pixels are each represented by a dummy thread.

Once the rasterizer circuitry 110 has determined the relevant active and dummy threads, those threads are grouped into thread groups, in the example illustrated in FIG. 4 each thread group containing four threads. These thread groups are then output to the thread execution unit 120 via an early test circuit 115. The early test circuit 115 may perform an early test operation in order to determine whether the pixels represented by each thread group actually require rendering. For example, having regard to the location of those pixels and taking into account their relevant depth information, it may be determined that the shader core has already rendered within the output image maintained in the output image buffer 135 pixels that occupy the same x, y coordinates within the output image, but which are closer to the viewer when viewed in the depth direction, and that accordingly the pixels of one or more thread groups do not need rendering. If this is the case, then the information produced by the rasterizer circuitry 110 for such thread groups is not used further. However, assuming that is not the case, then the thread group information is passed onto the thread execution unit 120. As identified in FIG. 4, the thread execution unit 120 (also referred to herein as the "tripipe") executes a shader program for each thread and hence executes the shader program individually for each pixel.

As part of the shading operation performed by the shader program, the thread execution unit 120 will need to access texture information maintained in the level one cache 105 or the other levels of cache/main memory in order to determine a texture to apply to the primitive. Each texture is broken down into an array of squares, each square being referred to as a texel to distinguish it from a pixel that forms a component square of the output image.

Once the shader program has been applied to each thread, this will result in pixel colours for the various pixels being output from the thread execution unit 120, along with associated control values. As will be understood, those control values may include depth information, alpha information (indicating a transparency of the pixel) and stencil information (identifying masking information).

Various late tests can be applied by the last test circuitry 125 based on this control information in order to determine whether the shaded pixels output from the thread execution unit 120 need to be incorporated within the final image maintained in the output image buffer 135. Such alpha tests, stencil tests and late depth tests will be well understood to those skilled in the art, and hence will not be discussed further herein.

Assuming the output from the thread execution unit 120 passes the late tests applied by the late test circuit 125, that data is provided to the blender unit 130 which combines the pixel colour data output from the thread execution unit with the pixel colour data maintained in the output image buffer 135 in order to produce a consolidated output image which is returned to the output image buffer 135.

Once all of the primitives for a particular tile have been passed through the shader core, then the resultant output image is written back to memory over path 140.

Figure 2:
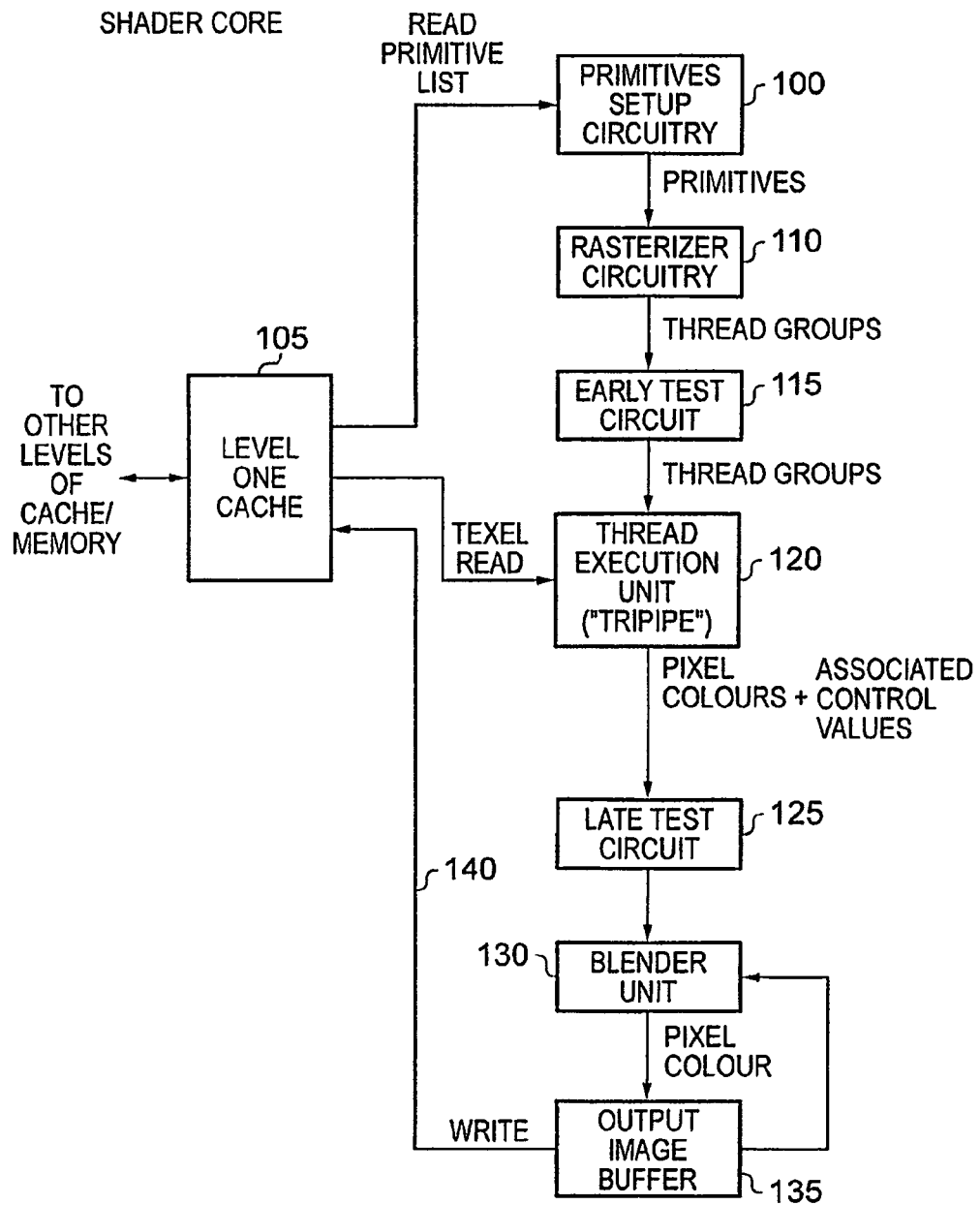
FIG. 2 is a block diagram illustrating a shader core forming a data processing apparatus of one embodiment.
Figure 3:
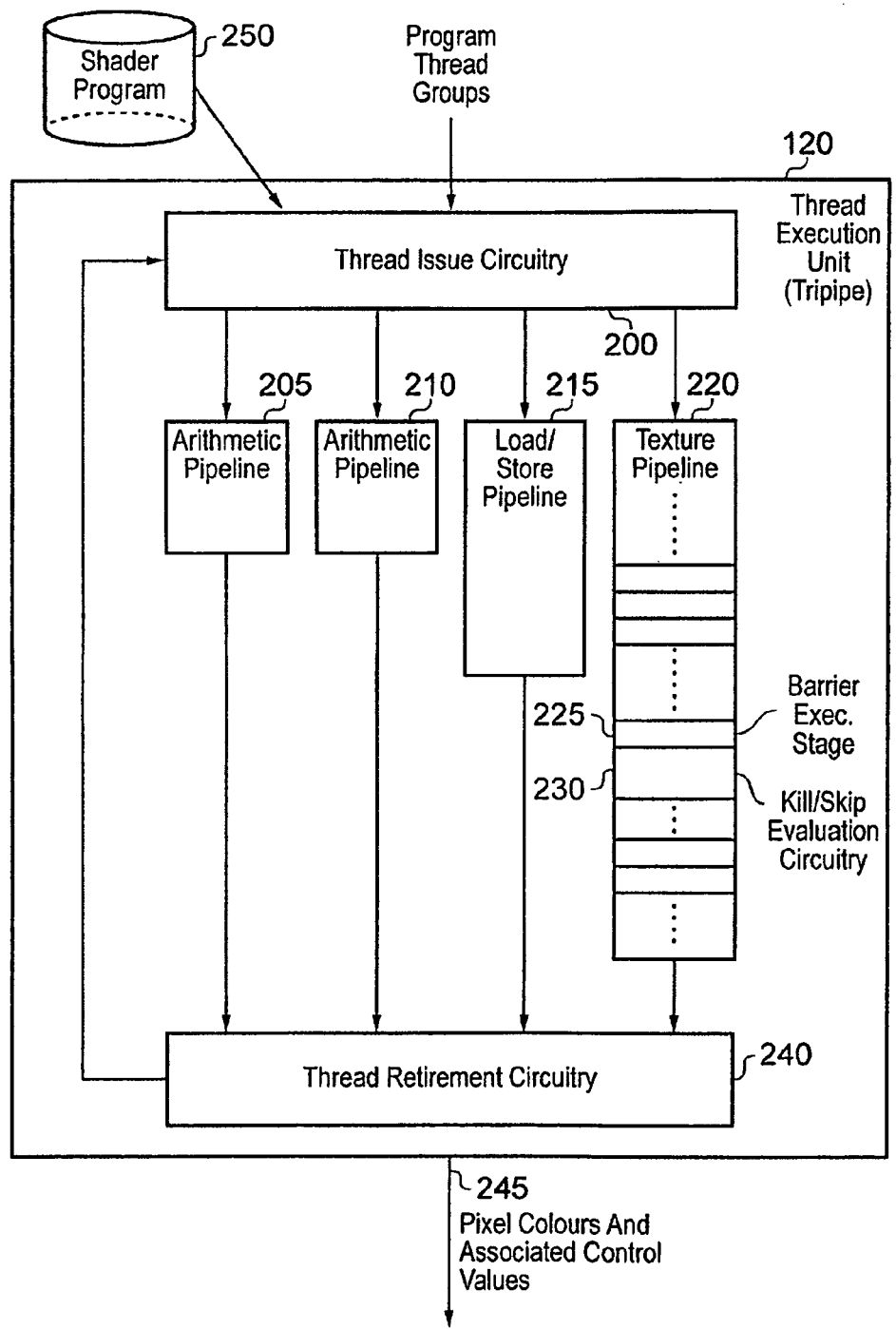
FIG. 3 is a block diagram illustrating in more detail the thread execution unit of FIG. 2 in accordance with one embodiment.

FIG. 3 is a block diagram illustrating in more detail the thread execution unit 120 of FIG. 2 in accordance with one embodiment. The program thread groups issued by the rasterizer circuitry 110 are received by thread issue circuitry 200 which also has access to the shader program 250 that is to be executed by the thread execution unit for each program thread within the received program thread group. The shader program 250 will include a variety of instructions to be executed sequentially in order to complete the shading process defined by the shader program, and for each instruction the thread issue circuitry will determine an appropriate pipeline to execute that instruction. In particular, as shown in FIG. 3, four execution pipelines are provided, namely two arithmetic pipelines 205, 210 for performing general arithmetic operations, a load/store pipeline 215 for loading data from cache/memory or for storing data back to cache/memory, and a texture pipeline 220 for performing texture lookup operations. The number of pipeline stages will vary dependent on the pipelines, and as shown in FIG. 3 the texture pipeline is typically a very long pipeline as there are multiple operations required in order to execute a texture lookup instruction.

The output of each of the pipelines 205, 210, 215, 220 is provided to thread retirement circuitry 240 which determines how to utilise the output from the relevant pipeline. If a final instruction in the shader program has not been reached, the thread retirement circuitry 240 will issue a control signal back to the thread issue circuitry 200 to cause the next instruction to be dispatched into the relevant pipeline. However, when the final instruction in the shader program has been executed by the relevant pipeline, then the final pixel colour value for the pixel associated with the thread will be available, and that pixel colour will be output over path 245 along with associated control values. In one embodiment, the final instruction of the shader program is an output pixel colour instruction which is executed within one of the arithmetic pipelines 205, 210 in order to store the final pixel colour in a particular working register and set a flag that causes the thread retirement circuitry 240 to propagate the final value from that register over path 245.

Within the plurality of program instructions constituting the shader program 250, at least one of the instructions will be a dependency-relevant instruction which requires at least partial execution for each thread in the received thread group in order to produce the data required to resolve an inter-thread dependency between threads in that thread group. In this embodiment, all such dependency-relevant instructions are texture lookup instructions which are executed within the texture pipeline 220. Inter-thread dependencies can occur for a variety of reasons, but in one embodiment such inter-thread dependencies occur due to information about surrounding pixels being used in determining the appropriate texture colour to apply to a particular pixel under consideration. In particular, textures are often pre-stored at a plurality of different resolutions in order to form a so-called MIPmap, such as illustrated schematically in FIG. 5. In this example, the texture under consideration represents a face, and is stored at a first resolution 350. In addition, dropping down by a factor of two each time, multiple other versions of the texture 355, 360, 365, 370, 375 are stored, each of these different versions being referred to as a different level within the MIPmap.

When a current pixel is considered, and accordingly the shader program is executed for the corresponding thread, a texture lookup instruction will at some point be executed, and during a first part of the texture lookup operation, the appropriate texture will be identified, and the coordinates of the pixel will be mapped into the texture space. The same process will also be performed for all of the other threads in the thread group, these typically representing a number of adjacent pixels. Once this texture coordinate calculation process has been performed for each of those threads, then it is possible to resolve the inter-thread dependency by calculating derivatives, this process determining the separation between the pixels as mapped into the texture coordinate space. This hence identifies the relevant texels to be accessed when calculating the texture value for the pixel under consideration, and thereafter processes such as bilinear interpolation can be performed in order to choose an appropriate combination of those texel values to represent the texture value for the current pixel.

Figure 5:
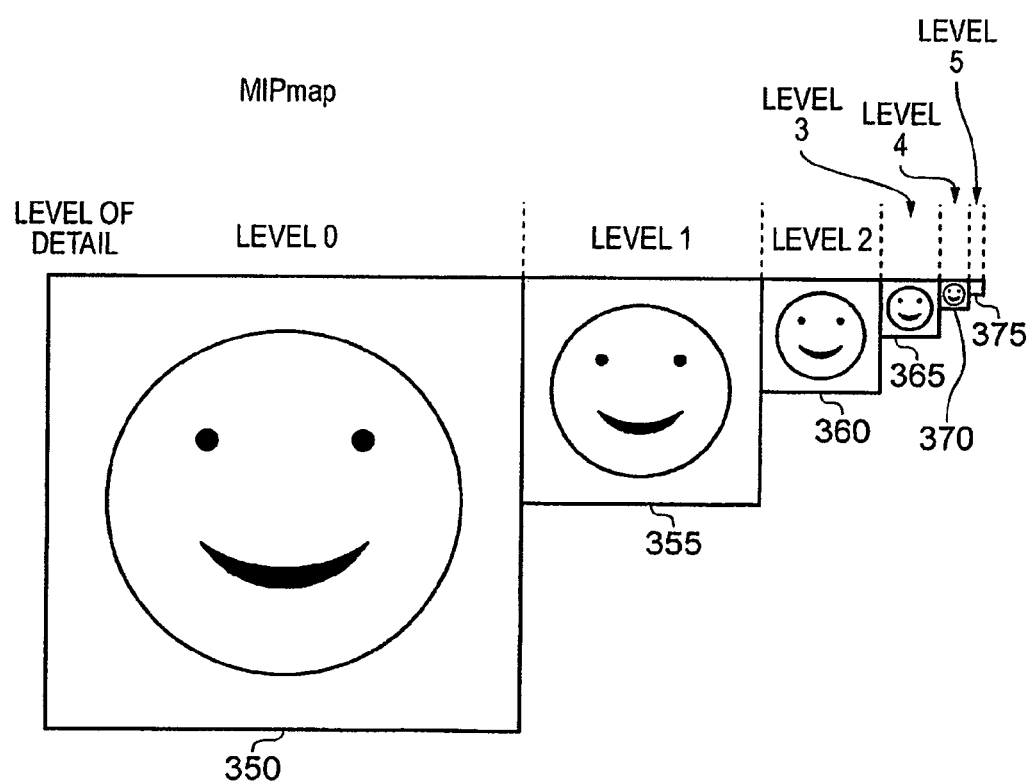
FIG. 5 schematically illustrates a MIPmap referenced during a texture lookup operation performed within the texture pipeline of FIG. 3 in accordance with one embodiment.

However, this process produces the best results in the final image if those accessed texels are adjacent within the texture space. This is why a number of different resolutions are stored within the MIPmap, so that the appropriate level can be chosen which will provide the best input to the bilinear interpolation process. Purely by way of example, if level zero of the MIPmap shown in FIG. 5 is at a resolution of 256×256, the level one resolution 355 will be 128×128, the level two resolution 360 will 64×64, the level three resolution 365 will be 32×32, etc. If the current tile being processed is an array of pixels 100×100, then it will be appreciated that the level one resolution 355 will provide the best source of texture information for adjacent pixels since when adjacent pixels are mapped into the level one texture space, they will generally map on to adjacent texels.

Within the texture pipeline 220, a barrier execution stage 225 is provided to ensure that for corresponding texture lookup instructions issued into the texture pipeline 220 for each of the threads of a thread group, execution of those instructions all reach the point where the texture coordinate values for the relevant pixels have been calculated so that the above mentioned derivatives (i.e. the relative separation between the adjacent pixels in the texture space) can be calculated and provided as an input to the remaining execution of all of those texture lookup operations. Only once all of this information is available can the remainder of any of the texture lookup instructions be executed in the remaining parts of the texture pipeline 220.

As discussed earlier with reference to the box 320 shown in FIG. 4, it is sometimes the case that a thread group will contain a mixture of active threads and dummy threads, as mentioned earlier the dummy threads being required to resolve the inter-thread dependency, but execution of those threads not producing an output that is required to form the pixel colour values output over path 245. Accordingly, once the barrier execution stage 225 has been reached, it is appropriate for the execution flow modification circuitry 30 to reference the control flags 40 in order to decide whether any part of that remaining execution can be omitted for the shader program being executed in respect of each dummy thread. In the embodiment illustrated in FIG. 3, this check is performed by the kill/skip evaluation circuitry 230, which makes reference to two control flags referred to as the kill flag and the skip flag. The kill and skip flags can be set globally for the entire shader program, or can be set for each texture lookup instruction. If the relevant kill flag is determined to be set by the evaluation circuitry 230, then all of the remaining execution of the texture lookup instruction within the texture pipeline 220 is omitted for each dummy thread, and the thread retirement circuitry 240 is caused to stop further execution of the shader program 250 for that dummy thread. This is typically done by the thread retirement circuitry 240 issuing an appropriate control signal back to the thread issue circuitry 200 to terminate execution of the relevant thread.

If instead the skip flag is determined to be set by the evaluation circuitry 230 for a dummy thread, then the remainder of the processing within the texture pipeline 220 for that texture lookup instruction is effectively bypassed for each dummy thread, and a default value is provided as an output result to the thread retirement circuitry 240. In one embodiment, the default value is set to a black colour value. There are a number of ways in which the remaining stages of the texture pipeline 220 can be bypassed, but in one embodiment the black colour value is merely passed through the remaining stages using a "bubble-type" mechanism that will be well-understood by a person skilled in the art. In effect, the instruction continues through all of the remaining stages, but at each stage no processing of the input value is performed and hence the input is passed unchanged to the output of that stage.

However, unlike the kill flag, the skip flag does not cause all of the remaining program instructions to be omitted, and hence once the default value has been passed to the thread retirement circuitry 240, and assuming the texture lookup instruction was not the last instruction of the shader program, then a signal will be issued to the thread issue circuitry 200 to cause the next instruction in the shader program to be dispatched to the appropriate pipeline.

The kill and skip flags can be set in a variety of ways. For example, they may be added manually by the programmer when creating the shader program. Alternatively, they may be inserted by a compiler when compiling the shader program by analysing the control flow and determining whether it is appropriate to set either the kill flag or the skip flag. In yet a further embodiment, such control flow analysis can be performed "on the fly" within the thread execution unit 120 in order to generate the appropriate kill and skip values.

Figure 6:
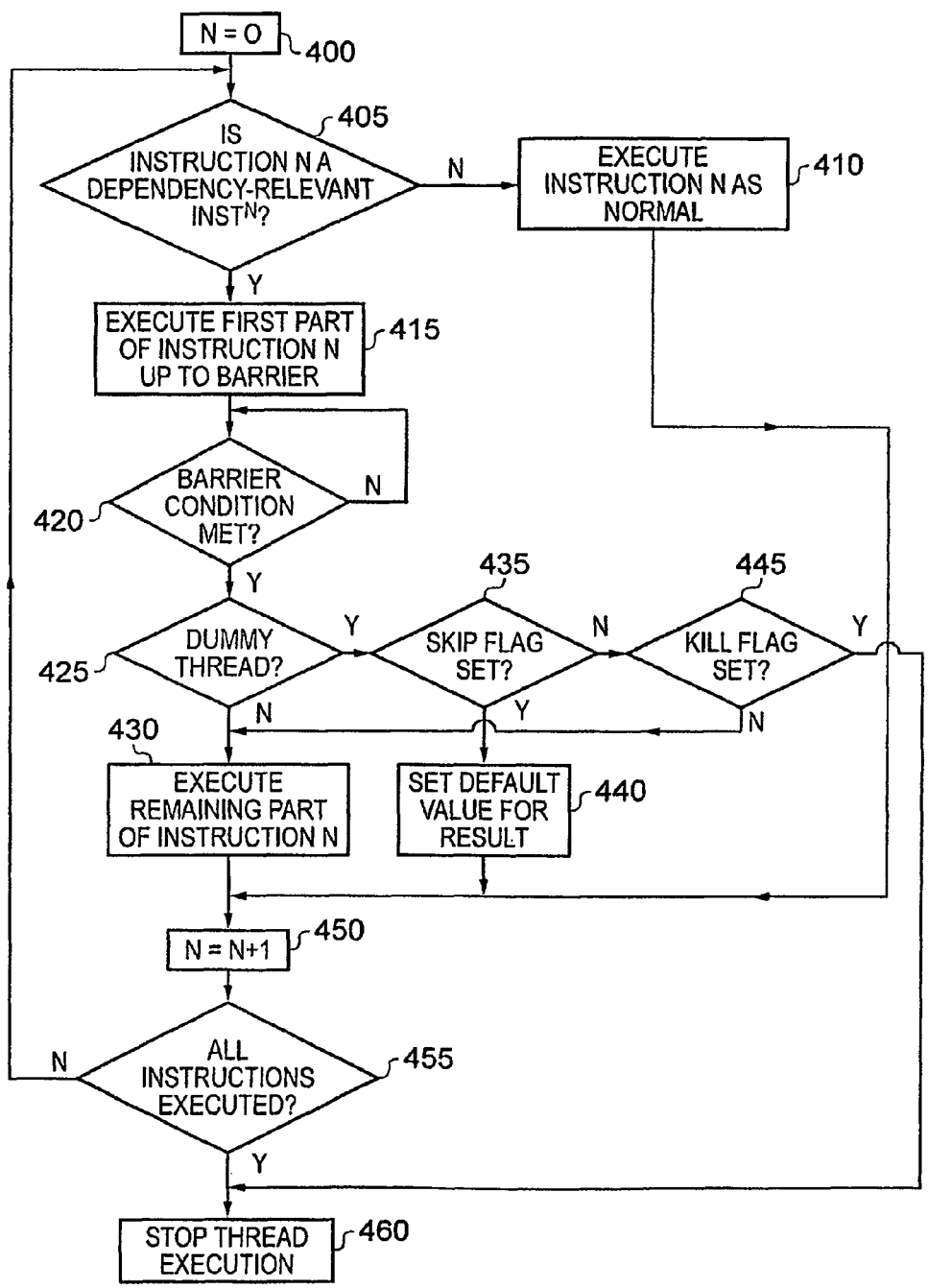
FIG. 6 is a flow diagram illustrating the operation of the thread execution unit of FIG. 3 when handling each thread of a received thread group in accordance with one embodiment.

The manner in which the execution flow of the shader program 250 is altered by the thread execution unit 120 dependent on the values of the skip and kill flags will be discussed further with reference to the flow diagram of FIG. 6. At step 400, the variable N is set equal to zero. Thereafter, at step 405 it is determined whether instruction N is a dependency-relevant instruction, e.g. a texture lookup instruction for the example discussed earlier with reference to FIG. 3. If it is not, then instruction N is executed as normal at step 410 within the relevant pipeline, and the process proceeds to step 450 where N is incremented, whereafter it is determined whether all instructions of the shader program have yet been executed. If not, the process then returns to step 405, whereas if all instructions have been executed, the process proceeds to step 460 where thread execution is stopped.

However, assuming at step 405 it is determined that instruction N is a dependency-relevant instruction, the process proceeds to step 415 where the first part of the instruction is executed up to the barrier execution stage 225. Thereafter, at step 420, it is determined whether the barrier condition has been met. As discussed earlier, the barrier condition will not be met until the first part of instruction N has also been executed for each of the other threads of the thread group, since only when this has occurred will all of the necessary information be available to resolve the inter-thread dependency. Accordingly, if the barrier condition has not been met, the process stalls at step 420 until the barrier condition is met.

Once the barrier condition has been met, the process proceeds to step 425, where the kill/skip evaluation circuitry 230 determines whether the shader program is being executed for a dummy thread. If not, the process proceeds to step 430 where the remaining part of the instruction N is executed within the remaining parts of the texture pipeline 220. Thereafter, N is incremented at step 450, and if it is determined at step 455 that not all of the instructions have yet been executed, the process returns to step 405. Otherwise, the thread is stopped at step 460.

However, assuming it is determined at step 425 that the thread is a dummy thread, then it is determined at step 435 whether the skip flag has been set. If so, a default value is set for the result output by the texture pipeline 220 to the thread retirement circuitry 240, and the process proceeds directly to step 450. As a result, the remaining part of the execution of instruction N is omitted.

If the skip flag is not set, then it is determined at step 445 whether the kill flag has been set. If not, then the process returns to step 430, but if the kill flag has been set, the process proceeds directly to step 460 where further thread execution is stopped. As a result, not only are all of the remaining parts of the execution of instruction N omitted, but also any remaining instructions in the shader program are also omitted.

FIG. 7 outlines the operations performed within the texture pipeline 220 when executing a texture lookup instruction. Firstly, a sampling descriptor is read which provides information about how a texture value is to be created from a texture for the pixel. The sampling descriptor will identify for example whether there is going to be a direct mapping of a pixel to one texel, or whether instead some form of interpolation such as bilinear interpolation is going to be used to create the pixel colour value from multiple texels, i.e. the texel to which the pixel maps along with contributions from the texels to which the other pixels defined by the thread group map.

Thereafter, the texture descriptor is read in order to obtain details of the texture to be applied to the current pixel. Thereafter, the coordinates within the texture space are calculated for the pixel under consideration. Assuming the sampling descriptor has indicated that some interpolation is needed, it is then necessary to wait for the barrier condition to be met, whereafter the necessary derivatives described earlier are calculated, with the results of that derivative calculation then being made available for the subsequent texture lookup steps for each thread of the thread group.

Thereafter, if the thread under consideration is a dummy thread, and either the skip or the kill flag is set, then some steps are taken instead of the default remaining steps specified by the texture lookup instruction. In particular, if the skip flag is set, the value black is written to the destination register for the texture lookup instruction, whereas if the kill flag is set, the thread is exited. If neither the skip or the kill flag is set, or the thread is not a dummy thread, then the final four steps identified after the "ELSE" condition take place. In particular, the relevant texels specified by the derivative information are obtained from memory, and then the relevant interpolation specified by the sampling descriptor is performed as necessary. The results are then combined, with the resultant texel colour being written to the destination register.

These final four steps require significant computation resource, and take a significant amount of time. Hence, it will be appreciated that by use of the skip and kill flags of the described embodiment, significant performance improvements can be realised by avoiding the need to perform these steps in situations where they are not required.

FIG. 8 illustrates five different examples of sequences of instructions which may form a shader program, and identifies the values that may be attributed to the kill and skip flags, along with an indication of the effect that those flags have on the execution of each instruction. Hence, considering example one, the texture lookup instruction will be passed through the texture pipeline 220, whilst both the subsequent lighting operation instruction and the output pixel colour instruction will be passed through one of the arithmetic pipelines 205, 210. However, for a dummy thread, if the kill flag is set, this causes the texture lookup instruction to be only partially executed as discussed earlier, whilst both the lighting operation instruction and the output pixel colour instruction are omitted.

As illustrated by example two, it may not be appropriate to set the kill flag if multiple texture lookup instructions are performed. However, by setting the skip flag, it can be ensured that for a dummy thread the texture lookup instructions are only partially executed, i.e. are only executed to the extent necessary to produce the data required to resolve the inter-thread dependency for an active thread.

Example three is similar to example one, but includes a preliminary arithmetic operation, to calculate a texture position. This can allow an effect to be applied before looking up in the texture, for example by altering pixel positions prior to the lookup. By such an approach, an effect such as a ripple effect can be applied to an image. In this example, as with example one, the kill flag is set, but since the evaluation of the kill flag only occurs at the kill/skip evaluation circuitry 230 of the texture pipeline 220 when the texture lookup instruction is executed, it will be clear that the calculate texture position instruction will be completely executed.

Example four shows an example where it is not appropriate to set either the kill flag or the skip flag. This is due to the store instruction occurring towards the end of the sequence, which requires the result to be stored out to memory via the load/store pipeline 215. It is hence assumed that that data is required later, and it would be wrong to omit that operation or indeed the lighting operation which will have modified the result produced by the texture lookup in order to create the pixel value that is stored to memory.

As mentioned earlier, whilst the kill flag and skip flag may be set globally for the shader program, they can be set independently for each texture lookup instruction, and example five gives an example of such a situation. In this example, the skip flag is set in association with the first texture lookup instruction whilst the kill flag is set in connection with the second texture lookup instruction. This ensures that the second texture lookup instruction is executed (albeit only partially for a dummy thread), but following the final texture lookup instruction the remaining operations are omitted for any dummy thread.

Figure 9:
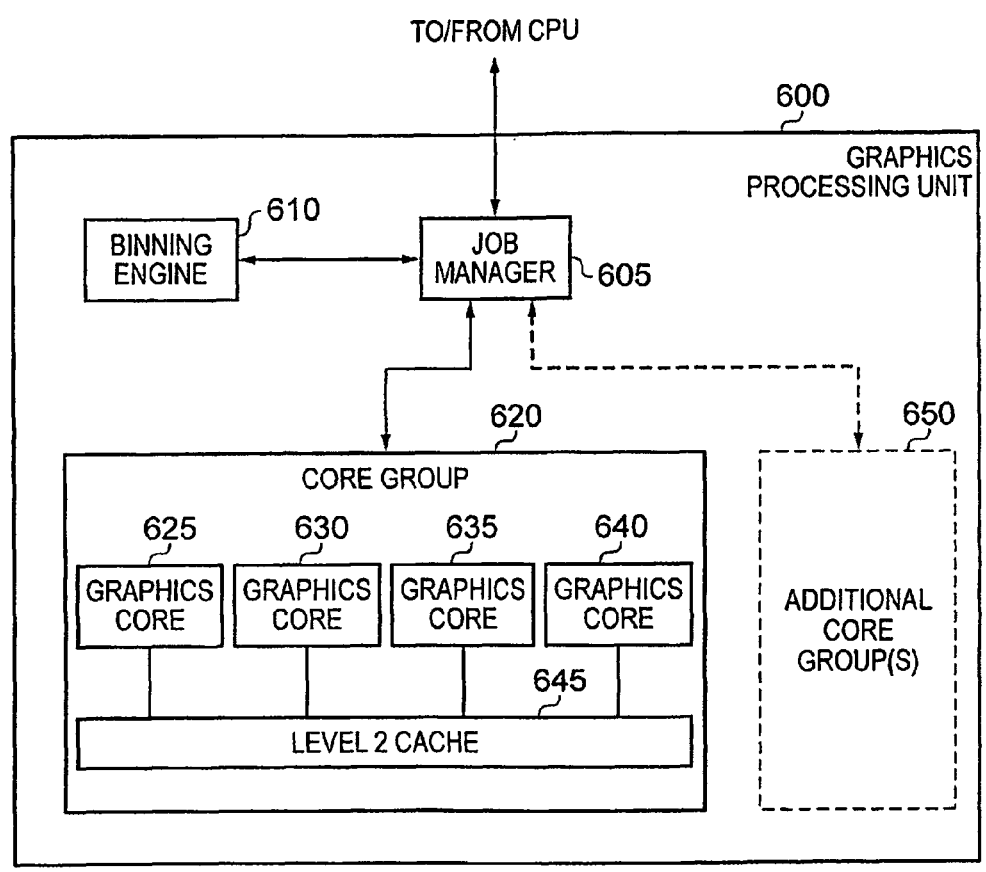
FIG. 9 illustrates a graphics processing unit in accordance with one embodiment.

As mentioned when describing FIG. 2, the circuitry of FIG. 2 may form a shader core of a graphics processing unit. A typical graphics processing unit may in fact include multiple graphics cores, as illustrated schematically in FIG. 9. In particular, in this example, a graphics processing unit 600 includes at least one core group 620, that core group including multiple graphics cores 625, 630, 635, 640. Each such graphics core may be constructed as shown in FIG. 2, and accordingly may include its own level one cache. A shared level two cache 645 may be provided for the graphics cores within the core group 620. One or more additional core groups 650 may also be provided, which can be constructed in the same way as the core group 620. A job manager 605 is used to interface to a central processing unit in order to receive tasks from the central processing unit, and coordinate the handling of those tasks by the various core groups 620. A binning engine 610 is used to perform the binning operation described earlier, in this example the graphics processing unit being a tile-based system and hence requiring a binning operation to be performed prior to the rendering operation, in order to determine which tiles each primitive intersects.

It will be appreciated that the above-described techniques employed within each graphics core can significantly improve the performance of the graphics processing unit, and further can significantly reduce the power consumption of the graphics processing unit.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. A data processing apparatus for processing a received workload in order to generate result data, comprising:
   a thread group generator configured to generate from the received workload a plurality of thread groups to be executed to process the received workload, each thread group comprising a plurality of threads, and at least one thread group having an inter-thread dependency existing between said plurality of threads;
   each thread being either an active thread whose output is required to form the result data, or a dummy thread required to resolve said inter-thread dependency for an associated active thread but whose output is not required to form the result data, the thread group generator identifying for each thread group any dummy thread within that thread group;
   a thread execution unit configured to receive each thread group generated by the thread group generator, and to execute each thread within a received thread group by executing a predetermined program comprising a plurality of program instructions; and execution flow modification circuitry, responsive to the received thread group having at least one dummy thread, to cause the thread execution unit to selectively omit at least part of the execution of at least one of said plurality of program instructions when executing said at least one dummy thread, in dependence on control information associated with the predetermined program, wherein said execution flow modification circuitry is configured to reference the control information at least once during execution of the predetermined program for each dummy thread, in order to determine whether to cause the thread execution unit to omit at least part of the execution of at least one of said plurality of program instructions when executing that dummy thread, wherein:

said plurality of program instructions comprise at least one dependency-relevant instruction which requires at least partial execution for each thread in the received thread group in order to produce data required to resolve said inter-thread dependency; and the execution flow modification circuitry is configured, for each dummy thread, to reference the control information on execution by the thread execution unit of at least one dependency-relevant instruction within said predetermined program, wherein:

said control information comprises a kill indicator which when set indicates that, after execution of said at least one dependency-relevant instruction causing said kill indicator to be referenced, execution of all remaining instructions in the predetermined program is to be omitted for each dummy thread.

2. A data processing apparatus as claimed in claim 1, wherein said control information is generated when the predetermined program is compiled.

3. A data processing apparatus as claimed in claim 1, wherein:
said thread execution unit is configured to execute said at least one dependency-relevant instruction as a multi-part process;
said data required to resolve said inter-thread dependency is produced after a first part of the multi-part process has been executed; and
said execution flow modification circuitry is configured to reference the kill indicator following execution by the thread execution unit of said first part of the multi-part process for each thread within the received thread group, and to further omit execution of remaining parts of the multi-part process for each dummy thread if said kill indicator is set.

4. A data processing apparatus as claimed in claim 1, wherein the control information is specified globally for the predetermined program.

5. A data processing apparatus as claimed in Claim 1, wherein the control information is specified separately for each dependency-relevant instruction of the predetermined program.

6. A data processing apparatus as claimed in claim 1, wherein:
the received workload is a graphics rendering workload; and
the thread execution unit is used to perform graphics rendering operations in order to generate, as said result data, pixel values and associated control values.

7. A data processing apparatus as claimed in claim 6, wherein said received workload is provided to the thread group generator as a plurality of primitives to be rendered.

8. A data processing apparatus as claimed in claim 1, wherein each thread group comprises four threads.

9. A graphics processing unit comprising at least one graphics core, each graphics core comprising a data processing apparatus as claimed in claim 1.

10. A data processing apparatus for processing a received workload in order to generate result data, comprising:
a thread group generator configured to generate from the received workload a plurality of thread group to be executed to process the received workload. each thread group comprising a plurality of threads, and at least one thread group having an inter-thread dependency existing between said plurality of threads;
each thread being either an active thread whose output is required to form the result data, or a dummy thread required to resolve said inter-thread dependency for an associated active thread but whose output is not required to form the result data, the thread group generator identifying for each thread group any dummy thread within that thread group;
a thread execution unit configured to receive each thread group generated by the thread group generator, and to execute each thread within a received thread group by executing a predetermined program comprising a plurality of program instructions; and
execution flow modification circuitry, responsive to the received thread group having at least one dummy thread, to cause the thread execution unit to selectively omit at least part of the execution of at least one of said plurality of program instructions when executing said at least one dummy thread, in dependence on control information associated with the predetermined program, wherein
said execution flow modification circuitry is configured to reference the control information at least once during execution of the predetermined program for each dummy thread, in order to determine whether to cause the thread execution unit to omit at least part of the execution of at least one of said plurality of program instructions when executing that dummy thread, wherein:
said plurality of program instructions comprise at least one dependency-relevant instruction which requires at least partial execution for each thread in the received thread group in order to produce data required to resolve said inter-thread dependency; and
the execution flow modification circuitry is configured, for each dummy thread, to reference the control information on execution by the thread execution unit of at least one dependency-relevant instruction within said predetermined program, wherein:
said control information comprises a skip indicator;
said thread execution unit is configured to execute said at least one dependency-relevant instruction as a multi-part process;
said data required to resolve said inter-thread dependency is produced after a first part of the multi-part process has been executed; and
said execution flow modification circuitry is configured to reference the skip indicator following execution by the thread execution unit of said first part of the multi-part process for each thread within the received thread group, and to omit execution of remaining parts of the multi-part process for each dummy thread if said skip indicator is set.

11. A data processing apparatus as claimed in claim 10, wherein said execution flow modification circuitry causes the thread execution unit to omit the remaining parts of the multi-part process by generating a default value to represent the result of execution of said at least one dependency-relevant instruction.

12. A data processing apparatus for processing a received workload in order to generate result data, comprising:
   a thread group generator configured to generate from the received workload a plurality of thread groups to be executed to process the received workload. each thread group comprising a plurality of threads, and at least one thread group having an inter-thread dependency existing between said plurality of threads;
   each thread being either an active thread whose output is required to form the result data. or a dummy thread required to resolve said inter-thread dependency for an associated active thread but whose output is not required to form the result data, the thread group generator identifying for each thread group any dummy thread within that thread group;
   a thread execution unit configured to receive each thread group generated by the thread group generator, and to execute each thread within a received thread group by executing a predetermined program comprising a plurality of program instructions; and
   execution flow modification circuitry, responsive to the received thread group having at least one dummy thread, to cause the thread execution unit to selectively omit at least part of the execution of at least one of said plurality of program instructions when executing said at least one dummy thread, in dependence on control information associated with the predetermined program, wherein
   said execution flow modification circuitry is configured to reference the control information at least once during execution of the predetermined program for each dummy thread, in order to determine whether to cause the thread execution unit to omit at least part of the execution of at least one of said plurality of program instructions when executing that dummy thread, wherein:
   said plurality of program instructions comprise at least one dependency-relevant instruction which requires at least partial execution for each thread in the received thread group in order to produce data required to resolve said inter-thread dependency and
   the execution flow modification circuitry is configured, for each dummy thread, to reference the control information on execution by the thread execution unit of at least one dependency-relevant instruction within said predetermined program, wherein:
   said thread execution unit comprises at least one execution pipeline and issue circuitry for issuing each instruction in the predetermined program to an appropriate one of said at least one execution pipeline;
   said at least one execution pipeline comprises a first execution pipeline for processing a first dependency-relevant instruction of said predetermined program;
   the issue circuitry is configured, when executing the received thread group, to issue the first dependency-relevant instruction for each thread of the received thread group into the first execution pipeline; and
   said first execution pipeline comprises a barrier execution stage which execution of the first dependency-relevant instruction for each thread must reach before any subsequent stages of the pipeline are entered to perform the remaining execution of the first dependency-relevant instruction for each thread, at said barrier execution stage the data required to resolve said inter-thread dependency having been produced; and
   said execution flow modification circuitry is configured to reference said control information after execution of the first dependency-relevant instruction for every thread of the received thread group has reached the barrier execution stage.

13. A data processing apparatus as claimed in claim 12, wherein said execution flow modification circuitry is incorporated into a stage of the first execution pipeline following the barrier execution stage.

14. A method of operating a data processing apparatus to process a received workload in order to generate result data, comprising:
   generating from the received workload a plurality of thread groups to be executed to process the received workload, each thread group comprising a plurality of threads, and at least one thread group having an inter-thread dependency existing between said plurality of threads, each thread being either an active thread whose output is required to form the result data, or a dummy thread required to resolve said inter-thread dependency for an associated active thread but whose output is not required to form the result data;
   identifying for each thread group any dummy thread within that thread group;
   for each thread group,
      executing within a thread execution unit each thread of said thread group by executing a predetermined program comprising a plurality of program instructions; and
      responsive to said thread group having at least one dummy thread, causing the thread execution unit to selectively omit at least part of the execution of at least one of said plurality of program instructions when executing said at least one dummy thread, in dependence on control information associated with the predetermined program;
      referencing the control information at least once during execution of the predetermined program for each dummy thread, order to determine whether to cause the thread execution unit to omit at least part of the execution of at least one of said plurality of program instructions when executing that dummy thread, wherein:
   said plurality of program instructions comprise at least one dependency-relevant instruction which requires at least partial execution for each thread in the received thread group in order to produce data required to resolve aid inter-thread dependency and
   said referencing step comprises, for each dummy thread, referencing the control information on execution by the thread execution unit of at least one dependency-relevant instruction within said predetermined program; and
   said control information comprises a kill indicator which indicates that, after execution of said at least one dependency-relevant instruction causing said kill indicator to be referenced, execution of all remaining instructions in the predetermined program is to be omitted for each dummy thread.

15. A data processing apparatus for processing a received workload in order to generate result data, comprising:
   a thread group generator means for generating from the received workload a plurality of thread groups to be executed to process the received workload, each thread group comprising a plurality of threads, and at least one thread group having an inter-thread dependency existing between said plurality of threads;

each thread being either an active thread whose output is required to form the result data, or a dummy thread required to resolve said inter-thread dependency for an associated active thread but whose output is not required to form the result data, the thread group generator means for identifying for each thread group any dummy thread within that thread group;

thread execution means for receiving each thread group generated by the thread group generator means, and for executing each thread within a received thread group by executing a predetermined program comprising a plurality of program instructions; and execution flow modification means for causing, in response to the received thread group having at least one dummy thread, the thread execution means to selectively omit at least part of the execution of at least one of said plurality of instructions when executing said at least one dummy thread, in dependence on control information associated with the predetermined program, said execution flow modification means is configured to reference the control information at least once during execution of the predetermined program for each dummy thread, in order to determine whether to cause the thread execution means to omit at least part of the execution of at least one of said plurality of program instructions when executing that dummy thread, wherein:

said plurality of program instructions comprise at least one dependency-relevant instruction which requires at least partial execution for each thread in the received thread group in order to produce data required to resolve said inter-thread dependency;

the execution flow modification means is configured, for each dummy thread reference the control information on execution by the thread execution unit of at least one dependency relevant instruction within said predetermined program; and said control information comprises a kill indicator which when set indicates that, after execution of said at least one dependency-relevant instruction causing said kill indicator to be referenced, execution of all remaining instructions in the predetermined program is to be omitted for each dummy thread.

* * * * *